United States Patent Office 3,002,918
Patented Oct. 3, 1961

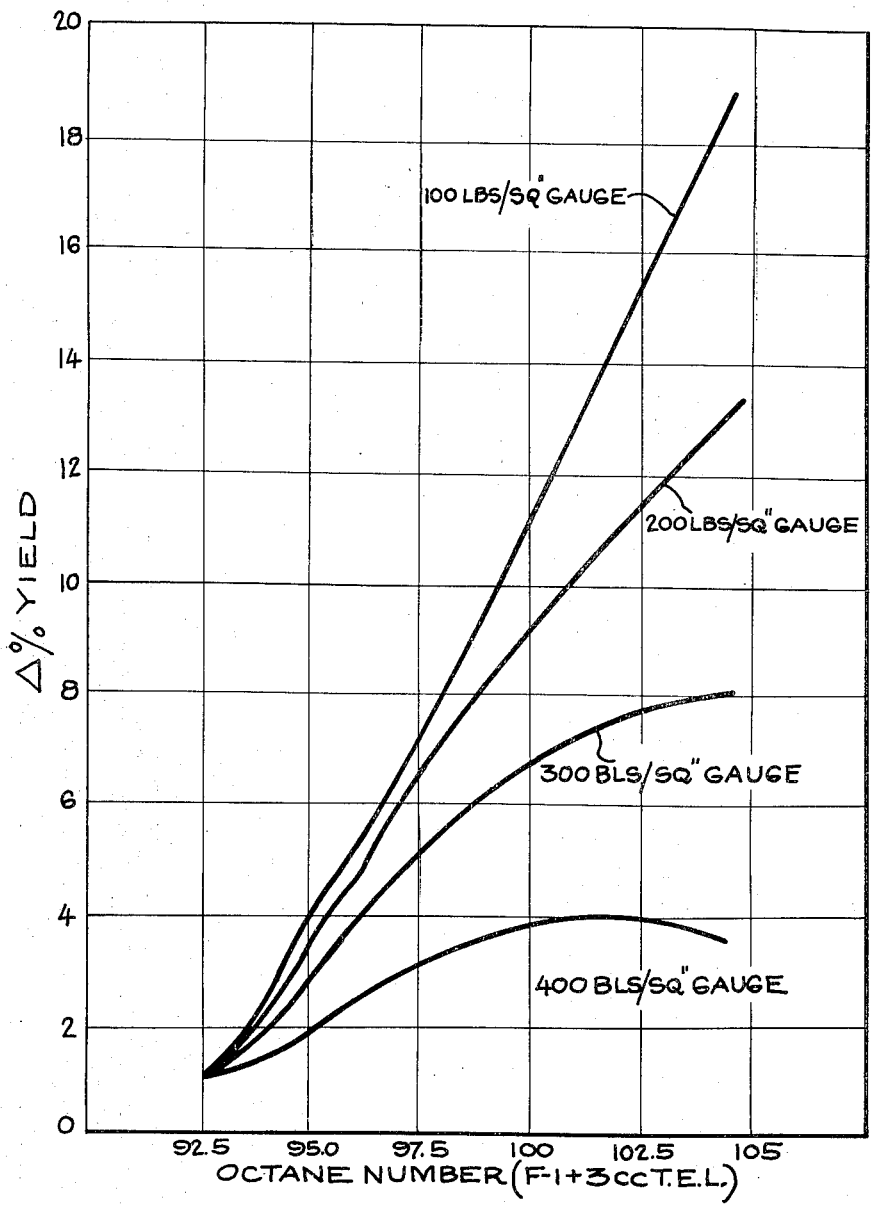

3,002,918
LOW PRESSURE REFORMING WITH ON-STREAM PERIODS OF GREATER DURATION
William H. Lang, Wenonah, N.J., assignor to Socony Mobil Oil Company, Inc., a corporation of New York
Filed Feb. 4, 1959, Ser. No. 791,223
5 Claims. (Cl. 208—134)

The present invention relates to reforming and, more particularly to reforming under low pressure with on-stream periods of greater duration through the use of higher hydrogen-to-naphtha mol ratios.

The most generally practiced use of reforming is as a means for raising the octane rating of motor gasoline although during periods when the demand for pure aromatic hydrocarbons is compelling selected narrow boiling range fractions of petroleum naphtha are reformed to produce pure benzene, pure toluene and the like.

Thermal reforming has been practically completely replaced by catalytic reforming. Although in some special processes thermal reforming is combined with catalytic reforming, the commercially practiced methods of upgrading naphtha most generally employed involve catalytic reforming primarily.

Catalytic reforming is carried out in accordance with moving bed technique, in accordance with fluidized technique, and in accordance with static bed technique. The present invention is not concerned with reforming in accordance with moving bed or fluidized techniques because in both of these methods of reforming portions of the catalyst in use are continuously regenerated. Consequently, the reforming unit is on-stream constantly except for shut-downs resulting from mechanical failure or other causes in no way connected with the deactivation of the catalyst by a carbonaceous deposit laid down thereon.

On the other hand, the duration of the on-stream period when reforming in accordance with static bed technique is very important. The effect can be readily appreciated when it is realized that regeneration of the catalyst usually requires at least one day and more often two to three days between the time when the feed to the unit is withdrawn and the time when the feed is admitted to the unit again. As a consequence, the practice has been followed to provide an alternate or swing reactor for static bed operations requiring frequent regeneration of the catalyst. Accordingly, the most widely practiced method of reforming requiring at least three reactors on-stream at all times provides a rather complicated system of piping so that the reactor containing the freshly regenerated catalyst is always in the same sequence in the series regardless of the spatial relation of the catalyst containing the freshly regenerated catalyst and the other reactors of the unit. The increased cost of the rather complicated system of piping together with the large number of valve changes required to take a reactor off-stream, put another reactor on-stream in its proper sequential position, and purge, regenerate, purge, and place on-stream again, and the chance for human or mechanical failure during the change from on-stream to regeneration to on-stream again has discouraged the practice of reforming at relatively low pressures of up to 300 or 400 p.s.i.g. employing static beds.

In direct contrast static bed reforming technique is used quite generally when employing reaction pressures of the order of 500 p.s.i.g. or more. Most units operating at 500 p.s.i.g. or more are on-stream a minimum of one year (300 days) provided the catalyst is not poisoned or there is no mechanical failure. In many instances reforming units operating at 500 p.s.i.g. or more have been on-stream for 300 days and have only been taken-off-stream in an attempt to anticipate mechanical failure, for inspection of the equipment, or for other reasons in no way connected with the reversible deactivation, or aging of the catalyst.

On the other hand, as is apparent from the graph of FIGURE 1, the yield of 10 RVP gasoline at any target octane rating of 95 (F–1+3 cc. TEL) or higher is markedly improved by reforming at pressures below 500 p.s.i.g. The graph of FIGURE 1 was plotted from the data presented in Table I. The increased yields of 10 RVP gasoline having various octane ratings when produced at reaction pressures less than 500 p.s.i.g. are set forth in Table I with the yield of 10 RVP gasoline under a reaction pressure of 500 p.s.i.g. as a base.

*Table I*

| Octane Rating, 10 RVP Gasoline (F–1+3 cc. TEL) | Increased Yield Volume Percent of Charge (Yield @ 500 p.s.i.g. as base) | | | |
|---|---|---|---|---|
| | 400 p.s.i.g. | 300 p.s.i.g. | 200 p.s.i.g. | 100 p.s.i.g. |
| 92.5 | 0.7 | 1.3 | 1.2 | [1] 0.8 |
| 95.0 | 1.6 | 2.7 | 3.3 | 3.8 |
| 97.0 | 3.0 | 5.0 | 6.6 | 7.8 |
| 100.0 | 3.9 | 6.8 | 9.2 | 11.1 |
| 102.5 | 3.8 | 7.6 | 11.4 | 15.2 |
| 104.5 | 3.7 | 8.1 | 13.1 | 18.9 |

[1] Average 1.0%.

For a unit reforming 10,000 barrels of naphtha per day an increase of one percent in the yield of 10 RVP reformate at various octane ratings represents the increased product value set forth in Table II.

*Table II*

| Octane Rating, 10 RVP Reformate (F–1+3 cc. TEL) | Estimated Increased Product Value, Dollars Per Day for 1% Increased Yield |
|---|---|
| 95 | $260 |
| 100 | 380 |
| 105 | 460 |

Simple multiplication of the values set forth in Table I by the values presented in Table II is indicative of the additional revenue accruing by reforming at pressures below 500 p.s.i.g.

However, when reforming a naphtha under a reaction pressure of 100 p.s.i.g. to provide a 10 RVP gasoline having an octane rating in the 97 to 100 range, the platinum-group metal catalyst must be regenerated every 28 days under the operating conditions generally employed. That is to say at a liquid hourly space velocity of 2, and a hydrogen-to-naphtha mol ratio of 10 to 1, one of the widely used commercial platinum-group metal catalysts aged at the rate of 2.8° F. per day. Thus, while a unit operating at 500 p.s.i.g. would have a catalyst life expectancy between regenerations of about 300 days when producing 10 RVP gasoline having an octane rating (F–1+3 cc. TEL) of 97 to 100, a unit operating at 100 p.s.i.g. would have a catalyst life expectancy between regenerations of only about 28 days when producing 10 RVP gasoline having an octane rating (F–1+3 cc. TEL) of 97–100. In other words, in 279 days the unit operating under 100 p.s.i.g. reaction pressure would be on-stream 252 days and revenue during 27 days would be lost. However, if the number of days on-stream can be increased so that a swing or alternate reactor with the complicated piping and valving referred to hereinbefore can be eliminated and on-stream periods between regenerations increased to the order of the on-stream periods between regenerations which have been general for units operating under 500 p.s.i.g. a considerable advance will have been made. The present invention provides this advance in the art.

Thus, for example, when operating at a reaction pressure of 100 p.s.i.g. in accordance with the principles of the present invention to produce 10 RVP gasoline having an octane rating (F–1±3 cc. TEL) of 97 to 100 on-stream periods between regenerations of 100 to 300 days can be obtained dependent upon the liquid hourly space velocity employed.

Accordingly, the present invention has for an object the provision of a method for reforming naphtha in the presence of hydrogen and particle-form solid reforming catalyst in accordance with static bed technique at pressures less than 500 p.s.i.g. wherein the on-stream life of the catalyst between regenerations is at least about three months. Another object of the present invention is to provide a method for reforming naphtha in the presence of hydrogen and particle-form solid reforming catalyst in accordance with static bed technique at pressures less than 500 p.s.i.g. wherein the hydrogen-to-naphtha mol ratio in the reaction zone(s) is at least thirty to one. A further object of the present invention is to provide a method for reforming naphtha in the presence of hydrogen and particle-form solid platinum-group metal reforming catalyst in accordance with static bed technique at pressures less than 500 p.s.i.g. wherein the on-stream life of the catalyst between regenerations is at least about three months. The present invention also has as an object the provision of a method for reforming naphtha in the presence of hydrogen and particle-form solid platinum-group metal reforming catalyst at pressures less than 500 p.s.i.g. wherein the hydrogen-to-naphtha mol ratio is at least thirty to one. The present invention likewise has as an object the provision of a method for reforming naphtha in the presence of hydrogen and particle-form platinum-group metal reforming catalyst at pressures less than 500 p.s.i.g. to produce 10 RVP gasoline having an octane rating (F–1+3 cc. TEL) of at least 95 wherein the on-stream life of the catalyst between regenerations is at least three months. Furthermore, the present invention has for an additional object the provision of a method for reforming naphtha in the presence of hydrogen and particle-form solid platinum-group metal reforming catalyst to produce 10 RVP gasoline having an octane rating (F–1+3 cc. TEL) of at least 95 wherein the hydrogen-to-naphtha mol ratio is at least thirty to one, and wherein the on-stream life of the catalyst between regenerations is dependent upon the liquid hourly space velocity, being greater the lower the liquid hourly space velocity and not less than about three months for a liquid hourly space velocity of 2 when producing 10 RVP gasoline having an octane rating (F–1+3 cc. TEL) of 97 to 100. The present invention has for a further object the provision of a method for reforming naphtha in the presence of hydrogen and particle-form solid platinum-group metal reforming catalyst at pressures less than 500 p.s.i.g. to produce 10 RVP gasoline having an octane rating (F–1+3 cc. TEL) of at least 95, wherein the hydrogen-to-naphtha mol ratio is at least thirty to one. These and other objects will become apparent to those skilled in this art from the following discussion of the present invention.

In general, the present invention provides a method for reforming naphtha in the presence of particle-form solid reforming catalyst in one or more reaction zones in accordance with static bed technique. The particle-form solid reforming catalyst can be of the non-noble metal type of which the conventional chromium oxide-aluminum oxide, and the molybdenum oxide-aluminum oxide catalysts are exemplary. The particle-form solid reforming catalyst also can be of the noble metal type of which the various platinum-group metal reforming catalysts such as the platinum on alumina with or without halogen are illustrative. Since the present invention is not concerned with the composition of the catalyst, specific compositions need not be described. The compositions of reforming catalysts both of the non-noble metal group and of the noble metal or platinum group metal class being well-known to those skilled in the art of hydrocarbon conversion.

Reforming with non-noble metal catalysts such as the chromia-alumina catalysts to which reference has been made hereinbefore are usually used at reaction pressures of the order of 50 to 600 p.s.i.g. Noble metal or platinum-group metal catalysts have been used at pressures of 50 to 1000 p.s.i.g. or more. The present invention provides for reforming at pressures less than 500 p.s.i.g., for example at pressures within the range of about 50 to about 400 p.s.i.g. and particularly preferred are pressures within the range of about 100 to about 300 p.s.i.g.

It has been prior art practice to reform at high pressures of 500 p.s.i.g. or more with hydrogen-to-naphtha mol ratios of 2 to 10 mols of hydrogen per mol of naphtha. Reforming in the presence of platinum-group metal catalysts has been carried out at high pressures, i.e., 500 p.s.i.g. or more, with hydrogen-to-naphtha mol ratios of 0.5 to 20 mols of hydrogen per mol of naphtha. Thus, for example, in U.S. Patent No. 2,654,694 a hydrogen-to-naphtha mol ratio within the range of 0.5 to 15 is recommended. In U.S. Patent No. 2,550,531 a hydrogen-to-naphtha mol ratio within the limits of 1 to 20 is considered satisfactory. On the other hand, reforming at pressures of 100 to 1000 p.s.i. in the presence of hydrogen in a mol ratio of hydrogen-to-naphtha within the range of 1 to 20 has been disclosed. However, a presently exemplary process for reforming in the presence of a platinum-group metal reforming catalyst at low pressures of 200 to 300 p.s.i.g. considers the use of hydrogen-to-naphtha mol ratios within the limits of 1 to 9 satisfactory and recommended. In direct contrast to the teachings of the prior art that the hydrogen-to-naphtha mol ratios should not exceed 20 to 1 the present invention provides for reforming in the presence of particle-form solid reforming catalysts of either the non-noble metal class or of the noble metal or platinum-group metal class at pressures within the range of about 50 to 400 p.s.i.g., preferably within the limits of about 100 to about 300 p.s.i.g. with hydrogen-to-naphtha mol ratio of at least 30 and preferably at least 40. The use of hydrogen-to-naphtha mol ratios in excess of 60 to 1 is a matter of local environment since at a mol ratio in excess of 60 to 1 the point of diminishing returns is reached.

The increased yield obtained when operating at pressures below 500 p.s.i.g., for example, at 100 p.s.i.g. is retained and the aging rate of the catalyst markedly reduced when the hydrogen-to-naphtha mol ratio is at least 30 to 1 and preferably at least 40 to 1. Thus, for example, Augusta reference naphtha, a naphtha of the Mid-Continent type, was pretreated to reduce the concentration of sulfur and nitrogen to innocuous amounts. The naphtha had an initial boiling point of 235° F., a fifty percent point of 275° F., and an end boiling point of 370° F. The naphtha had an octane rating (F–1+3 cc. TEL) of 68. The naphtha was reformed to produce a 10 RVP gasoline having an octane rating of 97 to 100 in the presence of a platinum-group metal catalyst comprising about 0.35 percent by weight platinum and about 0.05 percent by weight alumina on silica gel support. The naphtha was reformed under a pressure of 250 p.s.i.g. at 975° F. and a liquid hourly space velocity of 1. However, the hydrogen-to-naphtha mol ratio was varied from 10 to 1, to 20 to 1, to 40 to 1. The aging ratio of the catalyst at the various hydrogen-to-naphtha mol ratios are set forth in Table III.

Table III

Naphtha: Augusta reference naphtha B.R. 235° F. to 370° F.
Catalyst:
    0.35 weight percent platinum
    0.05 weight percent alumina ($Al_2O_3$)
    Carrier—silica gel
Reaction pressure: 250 p.s.i.g.
Reaction temperature: 975° F.
Liquid hourly space velocity—Volume of naphtha/hour/ volume of catalyst (LHSV)=1.

| Hydrogen-to-naphtha mol ratio: | Aging rate, ° F./D |
|---|---|
| 10/1 | 3.91 |
| 20/1 | 0.88 |
| 40/1 | 0.47 |

A portion of the same Augusta reference naphtha was reformed in the presence of a platinum-metal group catalyst under the conditions set forth in Table IV.

Table IV

Catalyst:
    0.6 percent by weight of platinum
    0.6 percent by weight of chlorine
    Alumina support
Feed: Augusta naphtha B.R. 235° F. to 370° F.

| | | | |
|---|---|---|---|
| Reaction Pressure, p.s.i.g. | 100 | 500 | 500 |
| Reaction Temperature, ° F. | 880 | 900 | 925 |
| Liquid Hourly Space Velocity, v./hr./v. | 1 | 1 | 2 |
| Hydrogen-to-naphtha mol ratio | 40 | 10 | 10 |
| 10 RVP gasoline, Yield, volume percent of charge | 98.0 | 90.5 | 90.5 |
| Octane Number, F-1+3 cc. TEL | 99.2 | 99.1 | 99.1 |
| Aging Rate, Degrees Fahrenheit/Day [1] | 0.23 | 0.20 | 0.20 |
| Life Expectancy of Catalyst [2] between regenerations, Days | 435±20 | 360±20 | 360±20 |

[1] Increase in reaction temperature to maintain substantially constant octane rating.
[2] Maximum permissible catalyst temperature, 980° F.

Those skilled in the art recognize that in addition to the increased revenue resulting from the increased number of days on-stream there is the advantage accruing from the effect of the reduced number of regenerations to which the catalyst must be subjected. In general, reforming catalysts can be regenerated only a substantially fixed number of times before the catalyst becomes useless because of loss of catalytic activity and/or mechanical strength. Consequently, the longer the on-stream life of the catalyst between regenerations, i.e., the regeneration expectancy, the fewer the regenerations in a given period of time and the longer the period or the greater the number of barrels of naphtha which can be reformed before the catalyst must be replaced.

Accordingly, the present invention, as described hereinbefore, provides a method of reforming naphtha to provide 10 RVP gasoline having an octane rating (F–1+3 cc. TEL) of at least 95 in the presence of particle-form solid reforming catalyst in accordance with static bed technique under reaction pressures not in excess of 400 p.s.i.g. wherein the hydrogen-to-naphtha mol ratio is at least 30 and preferably at least 40. Although the present invention provides, in general, for the use of any particle-form solid reforming catalyst it is preferred to employ platinum-group metal catalyst and specifically a platinum-group metal catalyst comprising about 0.1 to about 2.0 percent by weight of platinum and up to about 0.8 percent by weight of halogen, preferably chlorine, on a support such as alumina.

I claim:
1. In the method of reforming naphtha wherein a charge mixture comprising charge naphtha having an end boiling point of about 370° F. and hydrogen is passed in series flow through a plurality of reaction zones, each of said reaction zones containing a static bed of particle-form solid reforming catalyst under reforming conditions of temperature, superatmospheric pressure, and liquid hourly space velocity to produce 10 RVP leaded gasoline having an octane rating (F–1+3 cc. TEL) of at least 95, and wherein after a predetermined on-stream period the aforesaid catalyst is regenerated, the improvement which comprises employing a charge mixture comprising the aforesaid naphtha and hydrogen in a hydrogen-to-naphtha mol ratio of at least 30, and a superatmospheric pressure not exceeding 400 p.s.i.g., and regenerating the aforesaid catalyst after an on-stream period of at least 90 days dependent upon the liquid hourly space velocity.

2. In the method of reforming naphtha wherein a charge mixture comprising charge naphtha having an end boiling point of about 370° F. and containing not more than catalyst-innocuous concentrations of nitrogen, arsenic, and lead, and hydrogen is passed in series flow through a plurality of reaction zones each of said reaction zones containing a static bed of particle-form solid reforming catalyst under reforming conditions of temperature, superatomsphere pressure, and liquid hourly space velocity to produce 10 RVP leaded gasoline having an octane rating (F–1+3 cc.) of at least 95, and wherein after a predetermined on-stream period the aforesaid catalyst is regenerated, the improvement which comprises employing a charge mixture comprising the aforesaid naphtha and hydrogen in a hydrogen-to-naphtha mol ratio of at least 30, and a superatmospheric pressure not exceeding 400 p.s.i.g., and regenerating the aforesaid catalyst after an on-stream period of at least 90 days dependent upon the liquid hourly space velocity.

3. In the method of reforming naphtha wherein a charge mixture comprising charge naphtha having an end boiling point of about 370° F. and not more than catalyst-innocuous concentrations of nitrogen, arsenic, and lead, and hydrogen is passed in series flow through a plurality of reaction zones each of said reaction zones containing a static bed of particle-form solid reforming catalyst comprising about 0.1 to about 2 percent by weight of platinum and up to about 0.8 percent by weight of chlorine on an alumina support under reforming conditions of temperature, superatmospheric pressure, and liquid hourly space velocity to produce 10 RVP leaded gasoline having an octane rating (F–1+3 cc.) of at least 95, and wherein after an on-stream period the aforesaid catalyst is regenerated, the improvement which comprises employing a charge mixture comprising the aforesaid naphtha and hydrogen in a hydrogen-to-naphtha mol ratio of at least 30, and a superatmospheric pressure not exceeding 400 p.s.i.g., and regenerating the aforesaid catalyst after an on-stream period of at least 90 days dependent upon the liquid hourly space velocity.

4. In the method of reforming naphtha as set forth in claim 3 wherein the total reaction pressure is 100 p.s.i.g., the space velocity is 1, the hydrogen-to-naphtha mol ratio is 40, the octane number (F–1+3 cc. TEL) is about 99, and the on-stream time between regenerations is at least equal to the on-stream time between regenerations when reforming the same naphtha in the presence of the same reforming catalyst at total reaction pressure of 500 p.s.i.g., a liquid hourly space velocity of 1 to 2, and at a hydrogen-to-naphtha mol ratio of 10 to produce a leaded gasoline having an octane number (F–1+3 cc. TEL) of 99.

5. In the method of reforming naphtha as set forth in claim 3 wherein the liquid hourly space velocity is not greater than 2 and wherein the octane rating of the leaded gasoline is 95 to 100.

References Cited in the file of this patent

UNITED STATES PATENTS

| | | |
|---|---|---|
| 2,777,805 | Lefrancois et al. | June 15, 1957 |
| 2,838,444 | Teter et al. | June 10, 1958 |
| 2,867,579 | Loughran et al. | Jan. 6, 1959 |